June 18, 1968 C. C. TETZLAFF 3,388,438
HOSE CLAMP WITH LOAD DISTRIBUTING MEMBER
Filed April 9, 1965 2 Sheets-Sheet 1
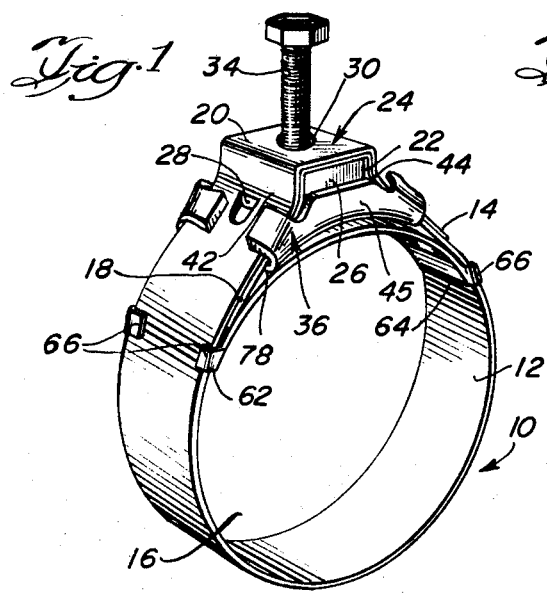
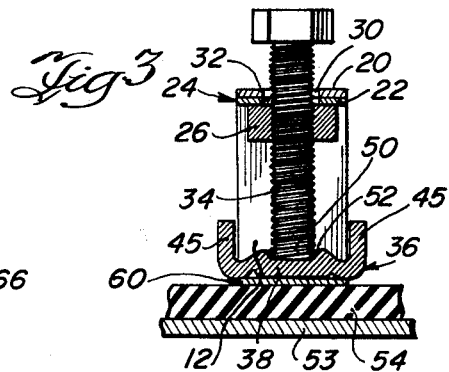
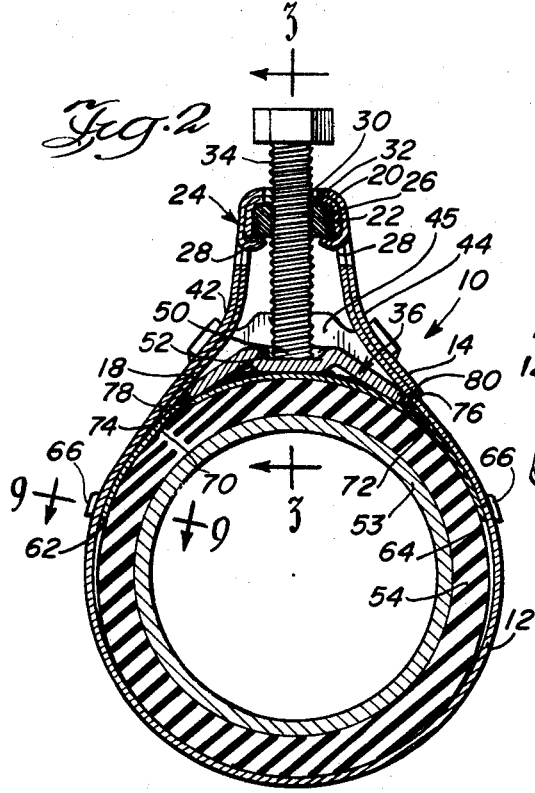
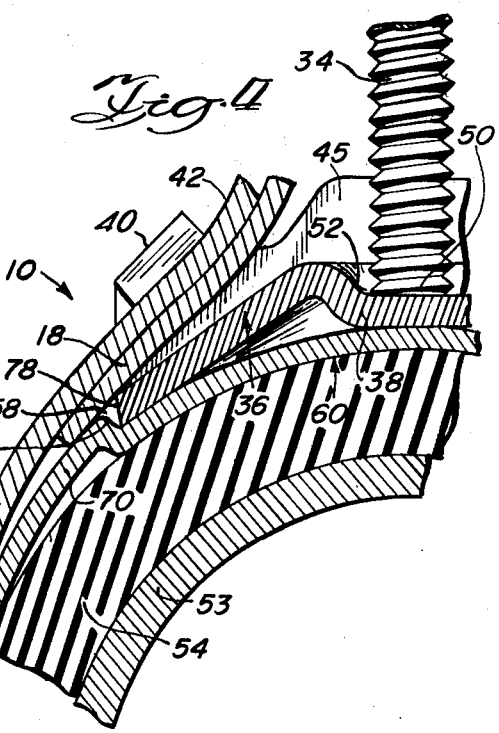
Inventor
Clarence C. Tetzlaff
By Silverman & Cos
Attorneys June 18, 1968 C. C. TETZLAFF 3,388,438
HOSE CLAMP WITH LOAD DISTRIBUTING MEMBER
Filed April 9, 1965 2 Sheets-Sheet 2
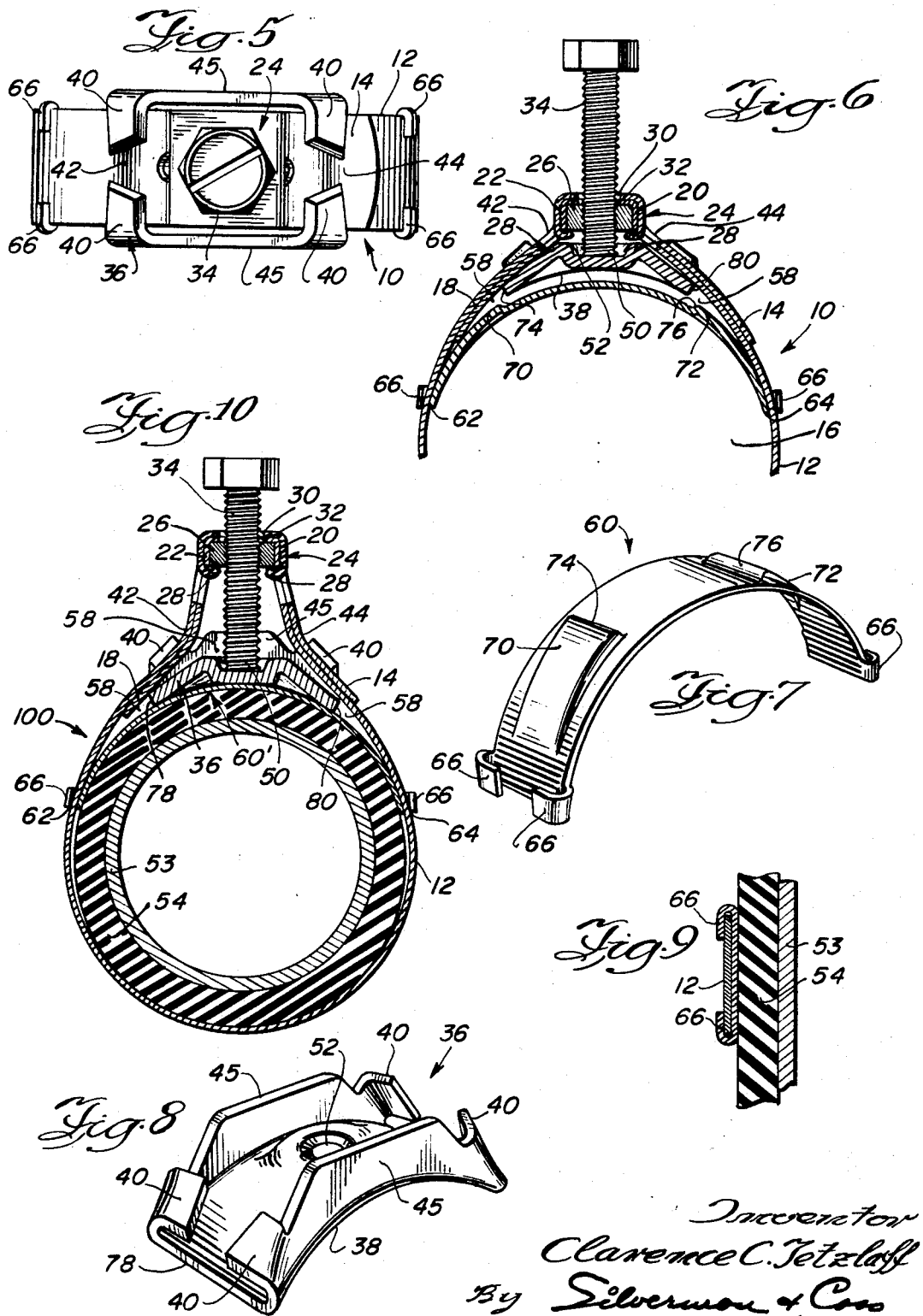
Inventor
Clarence C. Tetzlaff
By Silverman & Cox
Attorneys

United States Patent Office 3,388,438
Patented June 18, 1968

3,388,438
HOSE CLAMP WITH LOAD DISTRIBUTING MEMBER
Clarence C. Tetzlaff, River Forest, Ill., assignor to Wittek Manufacturing Co., Chicago, Ill., a corporation of Illinois
Filed Apr. 9, 1965, Ser. No. 447,014
7 Claims. (Cl. 24—278)

This invention relates generally to hose clamps, and more particularly, is concerned with a hose clamp having a radial take up screw and being provided with a load distributing member.

There are two well-known types of hose clamps of the radial screw variety which are utilized for connecting a flexible hose telescopically with a pipe. Such a connection is required primarily in various types of engines where liquid is to be conveyed by means of a flexible conduit between two components of the engine at least one of which has a protruding rigid pipe. A typical example is the common radiator hose which must be clamped to a protruding metal fitting of the radiator.

One type of such radial screw hose clamp is the so-called floating bridge type, an example of which is described and illustrated in Tetzlaff Patent 2,278,337. In this type of hose clamp, the screw end carries a bridge which is independent of the flexible metal band and adapted to move radially inward or outward with the rotation of the screw. Such hose clamps, as a general rule, are suitable for use on a single size of hose since a one-piece flexible strap or band is fixed in its peripheral length and configuration. Two piece straps do not have the strength of one-piece straps. Likewise such hose clamps were required to be somewhat larger in size than the second type to be described below, because of their construction.

The second type of radial hose clamp is of a variety which may be categorized as a fixed bridge type. Such a hose clamp is illustrated and described in Tetzlaff U.S. Patent 1,584,332. The clamp is characterized by the provision of a bridge of relatively rigid construction and material much heavier than that of the flexible metal band and the bridge having integral lateral arms bent to overlap the flexible band. The flexible band ends likewise are overlapped with aligned holes through which the screw extends into engagement with a nut with the free end of the screw pressing the center of the bridge. Taking up on the screw pulls the overlapped portions of the band radially outward from the bridge and thereby tends to decrease the diameter of the hose clamp by pulling the ends of the flexible band in a sliding movement past the inwardly bent integral arms.

The latter type of hose clamp was more advantageous because it occupied somewhat less volume, and because it had more versatility in that the range of sizes a given hose clamp with a one-piece band could accommodate was greater than in the case of the floating bridge type.

In the use of the second type of hose clamp with which this invention is concerned, namely, the fixed bridge hose clamp, in tightening the radial screw the pressure which is applied by the radial bridge upon the flexible hose member and the underlying pipe is concentrated in one area which, at most, is distributed over the surface defined by the bridge. The flexible metal band is in tension outside fo the bridge, that is at opposite ends thereof, and there may be, and usually is, a slight space defined by the flexible metal band from its tangential point to the place where it passes into the confines of the overlapped arms of the bridge. With no pressure applied to the flexible hose at these points, the likelihood of leakage is great, especially with the high pressures of fluids used in modern engines. Attempts made to increase the efficacy of the hose clamp by tightening the screw further resulted in application of forces greater than 20 inch-pounds of torque, and yet perfect sealing could not always be obtained. Even worse, where the pipe is formed of a thin metal material, such as, for example, brass, the pressure of the bridge on the metal member would flatten it and this would add to the difficulties.

Accordingly, it is an important object of the invention to provide a hose clamp of the fixed bridge type in which less torque need be applied to the screw in order effectively to cause sealing by application of the hose clamp.

In connection with the object above, the invention contemplates the use of an arcuate shoe adapted to be slidably secured on the inside of the hose clamp and connected to the band on opposite sides of the boss or housing of the nut which is connected with the radial screw, and this shoe serving as a structure which distributes the force applied through the screw and the fixed bridge.

Another important object of the invention is providing a force distributing member of the type mentioned above.

Other objects are concerned with the simplicity and novelty of the apparatus including certain details which make the distribution of force more readily applied circumferentially and spread over a relatively wide area so as to prevent collapse of the underlying pipe.

Other objects will appear as the description of the invention proceeds in connection with which preferred embodiments are illustrated in the accompanying drawings and described in the accompanying specification.

In the specification in which like characters of reference are used to identify equivalent elements and components:

FIG. 1 is a perspective view of a hose clamp constructed in accordance with the invention, shown in its relaxed condition, as furnished by the manufacturer, ready for use.

FIG. 2 is a median sectional view through the hose clamp of FIG. 1 taken on a plane perpendicular to the axis of the band loop, but showing the clamp tightly securing a hose to a pipe.

FIG. 3 is a fragmentary sectional view taken generally on the line 3—3 of FIG. 2 and in the direction indicated.

FIG. 4 is a fragmentary sectional view on a greatly enlarged scale of a detail of FIG. 2.

FIG. 5 is a top plan view of the hose clamp of FIG. 1.

FIG. 6 is a median sectional view through the hose clamp of FIG. 1 with the hose clamp in its relaxed condition, prior to use thereof.

FIG. 7 is a perspective view of the shoe or load distributing member used with the hose clamp of FIGS. 1-6.

FIG. 8 is a perspective view of the bridge member of the hose clamp of the invention.

FIG. 9 is a sectional view taken generally along the line 9—9 of FIG. 2 and in the direction indicated.

FIG. 10 is a sectional view similar to that of FIG. 2 but showing a modified form of the invention.

The invention is characterized by the provision of a radial hose clamp of the so-called fixed bridge type but having an arcuate, relatively flexible metal shoe which is called herein a load distributing member directly under the fixed bridge. The ends of the shoe have tabs or ears which are bent over onto the top of the flexible band of the hose clamp so that the shoe may slide, and in a preferred example, the shoe has bosses or protuberances which are engaged by the fixed bridge in order to assist in distributing the load.

Referring now to the drawings, the hose clamp of the invention is designated 10 generally in FIGS. 1, 2, 4 and 6 and the modified form thereof is designated 100 in FIG. 10. The characters of reference will be the same in both forms of the invention.

The hose clamp 10 comprises a single strip of relatively thing flexible metal in the form of a band 12 which is looped in a circle. This band being flexible is quite resilient being usually formed of steel strip. Portions of the band adjacent each end are overlapped one on top of the other in a manner to be described so that one free end 14 is on the outside of the loop which may be designated 16, and the other free end 18 is circumferentially spaced from the first end 14 and is on the inside of the loop. Between these two ends 14 and 18 each of the portions has a generally U-shaped configuration formed therein. These formations are in engagement one overlapping the other and will be called U-bends 20 and 22. The U-bends 20 and 22 combine to form a housing which is designated generally 24 within which there is disposed a nut 26 normally engaged against the inner and upper portion of the housing 24. It is held against rotation because it is substantially the same dimension across its flats as the inner distance between the arms of the inner U-bend 22 and such retention is further helped by means of small ears 28 punched from the U-bends and engaging under opposite edges of the nut.

Each of the U-bends 20 and 22 is provided with a central opening as shown at 30 and 32 in alignment with the threads in the nut so that a screw 34 may pass through these openings into engagement with the nut. Taking up on the screw will raise or lower the nut.

A bridge 36 shown best in FIG. 8 of heavier gauge material than the metal forming the band 12 and of arcuate construction is arranged over the otherwise open lower end of the housing 24. This bridge 36 has a lower wall 38 which follows in contour substantially the curvature of the loop 16 and it has also lateral arms or flanges 40 bent over and upon the arcuate necks 42 and 44 at the juncture of the loop 16 with the housing 24. Obviously, the neck 42 is a continuation of the band 12 as it passes between the circular formation and the outer U-bend 20 while the neck 44 is located between the free end 14 and the outer U-bend 20. Obviously also, the inner U-bend 22 follows this same configuration and is closely and intimate in engagement at all the points mentioned.

Between the arms 40 the bridge 36 has lateral side webs 45 which close off the otherwise open sides of the housing 24.

The screw is adapted to have its free end 50 engage in a suitable socket or depression 52 formed in the bridge 36.

As thus far described, the hose clamp is well-known and would operate in a manner explained above as having certain disadvantages. In accordance with the invention, there is another member which is attached to the hose clamp 10 which enables the application of pressure or force by means of movement of the screw to be distributed around the arcuate area against which the bridge normally would impinge.

In FIG. 2 there is illustrated a pipe 53 upon which a soft flexible hose 54 is adapted to be secured by means of the hose clamp 10. The hose clamp as described and without the load distributing member would tend to collapse the pipe and flatten the same because of the concentration of forces in the upper surface thereof as shown. There would be spaces as indicated at 58 where no force is applied so that an even distribution of force is not capable of being achieved.

According to the invention, there is a shoe 60 shown in FIG. 7 which is of arcuate configuration substantially the same width as the band 12 and which extends in an arcuate engagement along a substantial portion of the loop 16. In the example shown, it covers approximately one-third or more of the loop and has its free ends extending to the points 62 and 64, beyond the furthest point at which the free ends 14 and 18 normally would be located in the hose clamp in its initial and manufactured condition. These free ends 62 and 64 are each provided with fingers or ears 66 that engage over and upon the outer surface of the band, as shown, to enable sliding movement of the band relative to the shoe. The ears 66 being on the outer surface of the band 12, there is no interference with hose 54 either during installation or sliding movement of the shoe during use.

In the hose clamp 10 the shoe is imperforate and provided with a pair of radially outwardly extending bosses upset from the shoe as shown at 70 and 72. These bosses each have facing projections 74 and 76 substantially aligned with the circumferentially spaced ends 78 and 80, respectively of the bridge 36 so that in operation the centering of the shoe relative to the bridge 36 is assured. In addition, it is believed that the radial pressure applied by the bridge to the shoe may be also transmitted as tangential forces directed toward the free ends 62 and 64 of the shoe 60.

In accordance with the operation of clamps of this kind, as the screw is taken up, the nut 26 is forced to move radially outward of the loop 16. This in turn forces the overlapped U-bends 20 and 22 to move radially outward, since they are confined against circumferential movement both by the presence of the nut and the screw 34, thereby increasing the radial dimension of the housing 24. The bends 20 and 22, of course, are end portions of the band 12, and substantial tension is therefore applied to the band at the neck portions 42 and 44, tending to pull the band through the space provided by the overlapped arms 40 of the bridge 36. The effect of this is to constrict the band 12 and decrease the diameter of the loop 16. This tightens the hose clamp 10 on the flexible hose 54 and tightly presses the same upon the pipe 53. At the same time, the lower wall 38 of the bridge 36 commences to apply more and more radial pressure only at the area over which it engages the hose 54.

As previously explained, without the provision of the shoe 60, all of this pressure is concentrated, with adjacent area 58 that have no pressure at all. In the ordinary clamp, the rubber or other material from which the hose 54 may be made may flow into this adjacent space, but in any event, there will be little radial pressure applied at these points. The result has been, not only that it has required excessive torques to assure a fluid-tight connection, but in addition, the pipe 53 will tend to flatten at its pressure area immediately under the bridge 36.

In the structure of the invention, the pressure applied by the bridge 36 is not transmitted directly to the hose and pipe, but instead is transmitted through the medium of the shoe 60. The pressure is therefore not confined beneath the bridge 36, but is diffused over the entire area of the shoe 60 thereby distributing the load applied over a much greater circumferential portion of the assembly of hose and pipe. Because of this, it has been found, it requires much less torque applied to the screw 34 to achieve fluid-tight sealing with the hose clamp than with a clamp which does not have the shoe.

As a direct consequence of this, there is a substantial decrease in the likelihood of distortion of the pipe 53. Some tests made show fluid-tight sealing with as much as 30% less torque than required with conventional hose clamps of the fixed bridge type. Obviously the tendency to distort the pipe is substantially decreased also.

The provision of the bosses 70 and 72 stiffen the shoe 60 and in addition provide the projections 74 and 76 to center the shoe and which also assist in the sliding movement of the shoe. This sliding movement is needed to enable the shoe to accommodate to the loop 16 as it decreases in size during take up. The bridge ends apply some force toward the ends of the shoe 60 in a tangential direction and thereby the force from the bridge is also transmitted in a diffused manner.

The shoe 60 will provide excellent results even without the presence of the bosses 70 and 72 or the projections 74 and 76, as shown at 60′ in FIG. 10, wherein the shoe is in the form of a simple arcuate band with ears 66.

In both cases the shoe 60 or 60′ is made out of sheet metal that is quite thin, certainly of lesser gauge than the metal forming the bridge 36, but the functions described are not lessened because of this. Other stiffening means may be used in place of the bosses 70 and 72, and projections may be provided which differ from those shown at 74 and 76. Further, the load-distributing member or shoe may be provided attached to the undersurface of the bridge 36, as by spot welding. Such an expedient would eliminate the need for attaching the shoe to the band by the ears 66 since it would assure proper placement of the shoe relative to the bridge at all times, and in this regard, the projections 70 and 72 could be eliminated. The operation of the shoe as a load-distributing member would not be affected, but such a structure would tend to cause the ends 62 and 64 to assume positions spaced radially inward of the band, so that these might interfere with easy installation. For example, they would have to be pushed against the band in some way, or the loop 16 made large enough to accommodate a hose freely, even with the ends 62 and 64 spaced inwardly. The ends could be slidably secured closely to the band 12 by means of such ears 66, or the like, along with a permanent connection of the shoe to the bridge, but one must consider the added cost of the spot-welding or other securement procedure.

In any event, it is preferred that the ears 66 be used, keeping the loop 16 initially as small as possible, and that the shoe 60 be independent of the bridge 36 for economy in manufacture and effectiveness in function.

It will become apparent that many other variations can be made without departing from the spirit or scope of the invention as defined in the appended claims.

What it is desired to secure by Letters Patent of the United States is:

1. A hose clamp comprising a looped metal band having overlapped U-bends at the ends thereof forming a radially extending housing, a nut confined in the housing and a radial screw engaging the nut and extending outward through the U-bends and adapted upon take up to pull the nut radially outward to lengthen the housing, a relatively stiff arcuate bridge engaged upon the band across the radially inner end of the housing and having guide means for permitting sliding movement of the band while the screw is being taken up, and a load-distributing member of arcuate length substantially greater than that of the bridge and slidably secured at its ends to said band to be disposed beneath said bridge and adapted to diffuse the radial force applied by said bridge over an area greater than that of the bridge.

2. A hose clamp as claimed in claim 1 in which the load-distributing member is secured independently of said bridge.

3. A hose clamp as claimed in claim 1 in which the load-distributing member has centering means on its outer surface adapted to be engaged by the bridge during the use of the clamp.

4. A hose clamp as claimed in claim 1 in which the load-distributing member had at least two projections on its outer surface, the distance between which is substantially the same as the arcuate length of the bridge whereby during use of the ends of the bridge will engage between the projections.

5. In a hose clamp of the radial screw fixed bridge type in which there is a looped band having overlapped U-bends in the ends thereof forming a radially extending housing with a nut in the housing and a radial screw engaging the nut and extending radially outward of the housing and having an arcuate bridge extending across the inner end of the housing and engaging the band to confine and guide the same during taking up of the screw, the invention herein which comprises: an arcuate load distributing member mounted on the inside of the band beneath the bridge with its end slidably engaged to the band and having a circumferential length greater than that of the bridge, said load-distributing member being in the form of a shoe slidably secured to the band and adapted to be engaged by the bridge when the clamp is secured to a hose to diffuse the radial pressure applied by the bridge over the area of the shoe, but otherwise independent of the bridge.

6. The structure of claim 5 in which the shoe has projections adapted to be engaged by said bridge ends to apply tangential force to said shoe.

7. A hose clamp of the radial screw fixed bridge type having a flexible band with overlapped U-bends forming a housing, a nut in the housing, a radial screw engaging the nut and protruding from the housing, a bridge at the inner end of the housing connected across the band to guide and confine movement thereof during constriction caused by take up of the screw, and a load-distributing shoe slidably engaged with the band and supported radially inward of the bridge, said shoe having an arcuate length substantially greater than the arcuate length of the bridge and having integral ears at opposite ends thereof engaged upon the outer surface of said band to be guided by said band during sliding movement thereof.

References Cited
UNITED STATES PATENTS

| | | | |
|---|---|---|---|
| 2,321,930 | 6/1943 | Murray | 24—278 |
| 2,392,210 | 1/1946 | Zaleske | 24—278 |
| 2,515,484 | 7/1950 | Zaleske | 24—278 |
| 3,086,270 | 4/1963 | Zartler | 24—278 |

DONALD A. GRIFFIN, *Primary Examiner.*

JAMES L. JONES, JR., *Examiner.*